S. Emmore.
Dough-Kneading Machine.
No. 71723         Patented Dec. 3, 1867
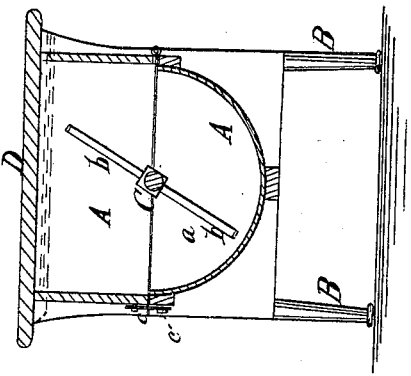
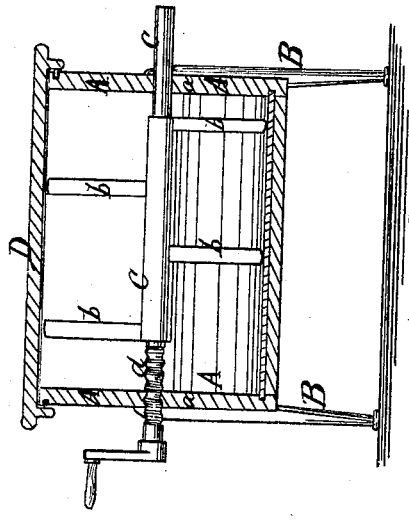
Witnesses.
Theo. Tusche
Wm. Trewin
Inventor.
S. Emmore
Per Munn & Co.
Attorneys

United States Patent Office.

SAMUEL EMMORE, OF STOUCHBURG, PENNSYLVANIA, ASSIGNOR TO HIMSELF AND A. BURKHOLDER, OF SAME PLACE.

Letters Patent No. 71,723, dated December 3, 1867.

IMPROVED DOUGH-KNEADING MACHINE.

*The Schedule referred to in these Letters Patent and making part of the same.*

TO ALL WHOM IT MAY CONCERN:

Be it known that I, SAMUEL EMMORE, of Stouchburg, in the county of Berks, and State of Pennsylvania, have invented a new and improved Dough-Kneading Machine; and I do hereby declare that the following is a full, clear, and exact description thereof, which will enable others skilled in the art to make and use the same, reference being had to the accompanying plate of drawings, forming part of this specification.

Figure 1 represents a longitudinal sectional view of my dough-kneading machine.

Figure 2 is a vertical cross-section of the same.

Similar letters of reference indicate corresponding parts.

This invention relates to a new machine for mixing and working dough, and consists in the use of an axle provided with stirrers. A screw-thread is formed near one end of the axle, at one bearing, so that when it is revolved it will receive a combined intermittent rotary and reciprocating motion. The stirrers are thus forced through the dough by the rotation of the shaft, and are also drawn through the same longitudinally, so as to thoroughly mix the same.

The tub in which the dough is mixed has a sliding flat cover, which may be used as a table for forming the dough, and for putting it into pans.

A represents a tub or vessel, supported upon legs B B, and composed of a lower stationary and an upper hinged part. The lower part is a semi-cylindrical vessel, in the heads $a$ $a$ of which the bearings for a shaft, C, are arranged. Upon the shaft C is mounted a series of stirrers, $b$ $b$, of suitable construction. The upper part of the vessel can be closed over the lower part when the dough has been filled into the latter, and the two parts are then connected by means of a hook or hooks, $c$, or other suitable device. The shaft C has a crank or other device, by means of which intermittent rotary motion is imparted to it. The shaft C is, near one end, provided with a screw-thread, as shown at $d$ in fig. 1, and thus, as it is turned, it is at the same time moved longitudinally, and the stirrers are drawn through the dough in both directions. By imparting intermittent rotary motion to the shaft, this reciprocating motion can be continually repeated, and thus the dough will be mixed and worked in a most thorough and satisfactory manner. The cover D of the upper hinged part of the vessel A is made flat, and slides upon the same, so that, by moving the cover D to one side, after the dough has been mixed, the interior of the tub A can be reached, and the whole or part of the contents removed, without opening the tub in the middle at the division of its two parts. The cover D will then serve as a table for filling the dough into pans, &c.

Having thus described my invention, I claim as new, and desire to secure by Letters Patent—

1. The shaft C, when provided with a screw-thread, so as to impart a combined intermittent rotary and reciprocating motion to the stirrers of a dough-kneading machine, substantially as and for the purpose herein shown and described.

2. The tub A, when consisting of two parts hinged together, in combination with the sliding cover D, all made and operating substantially as herein shown and described.

SAMUEL EMMORE.

Witnesses:
GEORGE C. REED,
JACOB TICE.